(12) United States Patent
Hong et al.

(10) Patent No.: US 12,019,136 B2
(45) Date of Patent: Jun. 25, 2024

(54) FPGA-BASED REAL-TIME PROCESSING SYSTEM AND METHOD APPLIED TO UNDERWATER ACOUSTIC POSITIONING AND REALIZING RECONFIGURABILITY AND MULTIPLE OUTPUT

(71) Applicant: SHANGHAI ACOUSTICS LABORATORY, CHINESE ACADEMY OF SCIENCES, Shanghai (CN)

(72) Inventors: Feng Hong, Shanghai (CN); Haihong Feng, Shanghai (CN); Minyan Huang, Shanghai (CN); Feng Chen, Shanghai (CN); Dingyun Li, Shanghai (CN)

(73) Assignee: SHANGHAI ACOUSTICS LABORATORY, CHINESE ACADEMY OF SCIENCES, Shanghai (CN)

( * ) Notice: Subject to any disclaimer, the term of this patent is extended or adjusted under 35 U.S.C. 154(b) by 748 days.

(21) Appl. No.: 17/256,672

(22) PCT Filed: May 13, 2019

(86) PCT No.: PCT/CN2019/086533
§ 371 (c)(1),
(2) Date: Dec. 29, 2020

(87) PCT Pub. No.: WO2020/140362
PCT Pub. Date: Jul. 9, 2020

(65) Prior Publication Data
US 2021/0141045 A1 May 13, 2021

(30) Foreign Application Priority Data
Jan. 4, 2019 (CN) .......................... 201910007523.1

(51) Int. Cl.
*G01S 1/76* (2006.01)
*G01S 3/86* (2006.01)
(Continued)

(52) U.S. Cl.
CPC .................. *G01S 1/76* (2013.01); *G01S 3/86* (2013.01); *G01S 15/006* (2013.01); *G01S 15/46* (2013.01); *G01S 15/88* (2013.01); *G05B 19/05* (2013.01)

(58) Field of Classification Search
CPC ... G01S 1/76; G01S 3/86; G01S 15/46; G01S 15/88; G05B 19/05; G05B 2219/21109
See application file for complete search history.

(56) References Cited

U.S. PATENT DOCUMENTS 3,660,808 A   5/1972  Bowyer et al.
7,613,858 B1* 11/2009 Jackson ................ G06F 17/142
                                                        716/101

(Continued)

FOREIGN PATENT DOCUMENTS

CN    102096064 A    6/2011
CN    104049246 A    9/2014
(Continued)

OTHER PUBLICATIONS

Wang et al. ("Doppler Compensation of Underwater Acoustic OFDM Based on Parallel Search in Time and Frequency Domain and FPGA Implementation," 2018 IEEE 18th International Conference on Communication Technology (ICCT), Chongqing, China, 2018, pp. 387-391) (Year: 2018).*
(Continued)

*Primary Examiner* — Yuqing Xiao
*Assistant Examiner* — Christopher Richard Walker
(74) *Attorney, Agent, or Firm* — Muncy, Geissler, Olds & Lowe, P.C.

(57) ABSTRACT

A field-programmable gate array (FPGA)-based real-time processing system applied to underwater acoustic position-
(Continued)

ing and realizing reconfigurability and multiple output is provided. The system includes a multi-interface control and command parsing module for automatically completing sample information transmission and command parsing; a finite-state machine (FSM) of sample management for calculating related data and completing splitting, flipping and writing of a sample; a parallel correlation processor group for completing, in parallel, high-performance processing operations regarding a plurality of targets; and a multiple output data former for simultaneously realizing data formation of a multiple output result and outputting a flag bit signal to the outside. A FPGA-based real-time processing control method is also provided that is applied to underwater acoustic positioning and realizing reconfigurability and multiple output. The system and the method are used, such that during a whole realization process, under multiple array elements and multiple targets, high-speed parallel correlation processing is realized, thereby solving problems in terms of real-time performance, universality and anti-noise performance, and effectively realizing high-performance correlation.

9 Claims, 9 Drawing Sheets

(51) Int. Cl.
*G01S 15/00* (2020.01)
*G01S 15/46* (2006.01)
*G01S 15/88* (2006.01)
*G05B 19/05* (2006.01)

(56) References Cited

U.S. PATENT DOCUMENTS

| | | | |
|---|---|---|---|
| 10,168,414 B2* | 1/2019 | Chen | G01S 5/0218 |
| 2008/0025614 A1* | 1/2008 | Hintz | G01S 7/411 |
| | | | 382/189 |
| 2008/0033695 A1* | 2/2008 | Sahara | G01H 1/003 |
| | | | 702/185 |
| 2016/0157828 A1* | 6/2016 | Sumi | G01N 29/46 |
| | | | 702/189 |
| 2017/0229029 A1* | 8/2017 | Klinger | H04B 7/0617 |
| 2018/0100922 A1* | 4/2018 | Wigh | G01S 15/87 |

FOREIGN PATENT DOCUMENTS

| | | |
|---|---|---|
| CN | 104181505 A | 12/2014 |
| CN | 106502147 A | 3/2017 |
| CN | 106569177 A | 4/2017 |

OTHER PUBLICATIONS

Ren et al. ("Acoustic underwater positioning on FPGA." 2014 Oceans—St. John's. IEEE, 2014.) (Year: 2014).*
Int'l Search Report for PCT/CN2019/086533, dated Oct. 8, 2019.

* cited by examiner

FPGA-BASED REAL-TIME PROCESSING SYSTEM AND METHOD APPLIED TO UNDERWATER ACOUSTIC POSITIONING AND REALIZING RECONFIGURABILITY AND MULTIPLE OUTPUT

CROSS-REFERENCE TO RELATED APPLICATION

This application claims priority of Chinese Invention Patent Application No. 201910007523.1 filed Jan. 4, 2019, which is incorporated herein by reference.

FIELD OF TECHNOLOGY

The present invention relates to the field of underwater acoustic signal processing, in particular to the field of real-time processing of underwater acoustic positioning and navigation, specifically, it refers to a FPGA-based real-time processing system and method applied to underwater acoustic positioning and realizing reconfigurability and multiple output.

DESCRIPTION OF RELATED ARTS

Real-time correlation processing technology is a very common technology in underwater acoustic positioning navigation, has very important application value. In applications involving underwater acoustic real-time signal processing, especially in applications such as underwater acoustic positioning and navigation, it is often necessary to use different frequency bands and different systems of signals to achieve multi-channel and multi-target detection, therefore, it is necessary to design the correlator to have sample automatic reconfigurable performance. In addition, considering that the variability of the detection signal form and signal length under different occasions will make the common correlators unable to complete the calculation, therefore, the research is based on the field programmable gate array design with parallel high performance and an extended universal correlator is also necessary. Finally, because the underwater physical environment is more complex, there are cases of multi-path phenomena, transmission attenuation and absorption attenuation, to ensure better detection performance, it will comprises correlation results, time gain compensation correlation results, and normalization correlation results and other results simultaneously output and complete the data formation, to achieve collaborative processing, which is also of great significance.

At present, the existing commonly used FPGA-based real-time correlation processing methods for underwater acoustic positioning navigation, the information of the sample is determined, and it cannot be automatically transmitted, automatically configured through multiple interfaces, and lacks versatility. In addition, it is difficult to achieve universal parallel computing during processing, and it is greatly affected by the changes of the channels numbers and target numbers, resulting in frequent changes to the logic design; finally, in the subsequent processing, the correlation multiple outputs are not formed into data output, and a collaborative processing mechanism cannot be formed. Therefore, regardless of the universality, real-time performance or anti-noise of real-time correlation processing, general FPGA-based real-time correlation processing methods are not good in performance.

SUMMARY OF THE INVENTION

The object of the present invention is to overcome the drawbacks of the prior arts, to provide a FPGA-based real-time processing system and method applied to underwater acoustic positioning and realizing reconfigurability and multiple output to meet the requirements of real-time performance, universality and anti-noise in navigation process.

In order to achieve the above objects, the present invention of FPGA-based real-time processing system and method applied to underwater acoustic positioning and realizing reconfigurability and multiple output is as follows:

the FPGA-based real-time processing system applied to underwater acoustic positioning and realizing reconfigurability and multiple output, characterized in that, the said system comprises:
- a multi-interface control and command analysis module, for automatically completing sample information transmission and command analysis;
- a FSM of sample management, connected with the multi-interface control and command analysis module, for calculating related data, and completing splitting, flipping and writing of a sample;
- a parallel correlation processor group, connected with the FSM of sample management, for completing, in parallel, high-performance processing operations regarding a plurality of targets;
- a multi-output data former, connected with the parallel correlation processor group, for simultaneously realizing data formation of a multiple output result and outputting a flag bit signal to the outside.

Preferably, the multi-interface control and command analysis module comprises:
- a controller group, for receiving commands and sample information of each interface;
- a multi-interface command configuration parser, connected with the controller group, for analyzing processing commands and sample information, and simultaneously transmitting to the FSM of sample management, and the sample information triggered by the command will cover each other after processing.

Preferably, the multi-interface control and command analysis module writes the sample information into a flash memory, for realizing automatically reading and automatically configuring under the restart or command analysis operations.

Preferably, the Finite-State Machine (FSM) of sample management comprises:
- a FSM of configuration control, connected with the Multi-interface command configuration parser, for calculating a number of related points for expectation, the required number of parallel channels and the paddle number of sub-correlation units;
- a sample storage RAM unit, comprising a real part RAM subunit group and an imaginary part RAM subunit group, both connected with the parallel correlation processor group, for splitting and flipping the sample information and writing them into the real part RAM subunit group and the imaginary part RAM subunit group respectively, the real part RAM subunit group is for storing real part data, the imaginary part RAM subunit group is for storing imaginary part data.

Preferably, the parallel correlation processor group comprises:
- a delay controller, connected with the sample storage RAM unit, for delay control of multiple signals separately;
- a multi-path correlation calculation subunit group, connected with the delay controller, for completing the real part and imaginary part calculation of data in parallel;

a correlation signal synthesis unit, connected with the multi-path correlation calculation subunit group, for accumulating the real part and the imaginary part respectively, and performing comprehensive calculations on the correlation sub-signals.

Preferably, the multi-output data former comprises:
a calculation output unit, connected with the parallel correlation processor group, for calculating and multiply outputting correlation energy results, correlation energy results, normalized correlation coefficient results after time gain compensation, and correlation time delay results, correlation phases result;
a data forming unit, connected with the calculation output unit, for storing each output result into a data forming memory and outputting the flag bit signal to the outside.

The FPGA-based real-time processing control method applied to underwater acoustic positioning and realizing reconfigurablility and multiple output based on the above system, characterized in that, the method comprises following steps:
(1) the multi-interface control and command analysis module completes the reconfiguration of real-time related processing samples;
(2) the FSM of sample management calculates the a number of relevant points for expectatioin, a required number of parallel channels and a paddle number of sub-correlation units, and completes splitting, flipping and writing of a sample;
(3) the parallel correlation processor group completes high-performance related processing for multiple array elements and multiple targets in parallel;
(4) the multi-output data former through the correlation energy results, the normalized correlation coefficient results after time gain compensation, correlation time delay results and correlation phases result to complete multiple output data results.

Preferably, the FSM of sample management comprises a FSM of configuration control and a sample storage RAM unit, the sample storage RAM unit comprises a real part RAM subunit group and an imaginary part RAM subunit group, the step (2) further comprises the following steps:
(2.1) the FSM of configuration control completes command analysis and obtain commands and data;
(2.2) the FSM of configuration control calculates the a number of related points for expectation, the required number of parallel channels and the paddle number of sub-correlation units;
(2.3) the sample storage RAM unit splits and flips the sample information and writes them into the real part RAM subunit group and the imaginary part RAM subunit group.

Preferably, the step (3) further comprises the following steps:
(3.1) the delay controller completes signal delay control;
(3.2) the multi-path correlation calculation subunit group completes the real part and imaginary part calculation of data in parallel;
(3.3) the correlation signal synthesis unit performs comprehensive calculations on the correlation sub-signals.

Using the FPGA-based real-time processing system and method applied to underwater acoustic positioning and realizing reconfigurability and multiple output, such that during a whole realization process, under a plurality of array elements and a plurality of targets, high-speed parallel correlation processing is realized, thereby solving problems in terms of real-time performance, universality and anti-noise performance, and effectively realizing high-performance correlation. It can be automatically transmitted and configured through multiple interfaces, which is universal; realize universal parallel computing during processing, not affected by changes in the number of channels numbers and target numbers, and the related of multiple outputs form into data output, forming a collaborative processing mechanism, it has obvious innovation and improvement in the universality, real-time performance and anti-noise performance of real-time correlation processing.

DETAILED DESCRIPTION OF THE PREFERRED EMBODIMENT

In order to be able to understand the technical content of the present invention more clearly, is further exemplified by the following detailed description of embodiments.

The FPGA-based real-time processing system applied to underwater acoustic positioning and realizing reconfigurablility and multiple output of the present invention, wherein the system comprises:

a multi-interface control and command analysis module, for automatically completing sample information transmission and command analysis;

a FSM of sample management, connected with the multi-interface control and command analysis module, for calculating related data, and completing splitting, flipping and writing of a sample;

a parallel correlation processor group, connected with the FSM of sample management, for completing, in parallel, high-performance processing operations regarding a plurality of targets;

a multiple output data former, connected with the parallel correlation processor group, for simultaneously realizing data formation of a multiple output result and outputting a flag bit signal to the outside.

As a preferred embodiment of the present invention, the multi-interface control and command analysis module comprises:

a controller group, for receiving commands and sample information of each interface;

a multi-interface command configuration parser, connected with the controller group, for analyzing processing commands and sample information, and simultaneously transmitting to the FSM of sample management, and the sample information triggered by the command will cover each other after processing.

As a preferred embodiment of the present invention, the multi-interface control and command analysis module writes the sample information into a flash memory, for realizing automatically reading and automatically configuring under the restart or command analysis operations.

As a preferred embodiment of the present invention, the FSM of sample management comprises:

a FSM of configuration control, connected with the Multi-interface command configuration parser, for calculating a number of related points for expectation, the required number of parallel channels and the paddle number of sub-correlation units;

a sample storage RAM unit, comprising a real part RAM subunit group and an imaginary part RAM subunit group, both connected with the parallel correlation processor group, for splitting and flipping the sample information and writing them into the real part RAM subunit group and the imaginary part RAM subunit group respectively, the real part RAM subunit group is for storing real part data, the imaginary part RAM subunit group is for storing imaginary part data.

As a preferred embodiment of the present invention, the parallel correlation processor group comprises:

a delay controller, connected with the sample storage RAM unit, for delay control of multiple signals separately;

a multi-path correlation calculation subunit group, connected with the delay controller, for completing the real part and imaginary part calculation of data in parallel;

a correlation signal synthesis unit, connected with the multi-path correlation calculation subunit group, for accumulating the real part and the imaginary part respectively, and performing comprehensive calculations on the correlation sub-signals.

As a preferred embodiment of the present invention, the multi-output data generator comprises:

a calculation output unit, connected with the parallel correlation processor group, for calculating and multiply outputting correlation energy results, correlation energy results, normalized correlation coefficient results after time gain compensation, and correlation time delay results, correlation phases result;

a data forming unit, connected with the calculation output unit, for storing each output result into a data forming memory and outputting the flag bit signal to the outside.

The FPGA-based real-time processing control method applied to underwater acoustic positioning and realizing reconfigurablility and multiple output based on the above system, the method comprises following steps:

(1) the multi-interface control and command analysis module completes the reconfiguration of real-time related processing samples;

(2) the FSM of sample management calculates the a number of relevant points for expectation, a required number of parallel channels and a paddle number of sub-correlation units, and completes splitting, flipping and writing of a sample;

(2.1) the FSM of configuration control completes command analysis and obtain commands and data;

(2.2) the FSM of configuration control calculates the a number of relevant points for expectation, the required number of parallel channels and the paddle number of sub-correlation units;

(2.3) the sample storage RAM unit splits and flips the sample information and writes them into the real part RAM subunit group and the imaginary part RAM subunit group;

(3) the parallel correlation processor group completes high-performance related processing for multiple array elements and multiple targets in parallel;

(3.1) the delay controller completes signal delay control;

(3.2) the multi-path correlation calculation subunit group completes the real part and imaginary part calculation of data in parallel;

(3.3) the correlation signal synthesis unit performs comprehensive calculations on the correlation sub-signals;

(4) the multi-output data former through the correlation energy results, the normalized correlation coefficient results after time gain compensation, correlation time delay results and correlation phases result to complete multiple output data results.

In the specific embodiment of the present invention, the invention discloses an FPGA-based real-time correlation processing method applied to underwater acoustic positioning and realizing reconfigurablility and multiple output, the method comprises: use multi-interface control to complete the reconfiguration of real-time related processing samples; use FSM of sample management calculates the a number of relevant points for expectation, a required number of parallel channels and a paddle number of sub-correlation units, and completes splitting, flipping and writing of a sample; use highly resource-saving of parallel correlation processor group to completes high-performance related processing for multiple array elements and multiple targets in parallel; use the correlation energy results, the normalized correlation coefficient results after time gain compensation and the correlation time delay-phase results to form multiple output data results. The invention also discloses an FPGA-based real-time correlation processing control device applied to underwater acoustic positioning and realizing reconfigurablility and multiple output.

The device comprises:

a multi-interface control and command analysis unit, for completing the multi-interface control and command analysis unit automatically completing sample information transmission and command analysis;

a FSM of sample management, for calculating the a number of relevant points for expectation, the required number of parallel channels and the paddle number of sub-correlation units, completing splitting, flipping and writing of a sample;

a highly resource-saving of parallel correlation processor group, for completing high-performance related processing for multiple array elements and multiple targets in parallel;

a multiple output data former, for completing the correlation energy results, the normalized correlation coefficient results after time gain compensation and the correlation time delay-phase results to form calculation of the multiple output data results of simultaneous output.

a multi-interface control and command analysis unit, the parsed command and sample information are simultaneous directly used by subsequent units, and the data is written into FLASH at the same time when receiving the sample information; each restart or command analysis can automatically read from FLASH and realize automatic configuration. A command analysis unit, all can be simultaneously processing, and the sample information of each interface processor can be processed by "or" to cover each other after being triggered by the command.

a FSM of sample management, specifically for calculating a number of related points for expectation, the required number of parallel channels and the paddle number of sub-correlation units, completing splitting, flipping and writing of a sample, comprises: automatically calculate the number of related points for expectation, the required number of parallel channels and the paddle number of sub-correlation units according to the rules; splitting, flipping and writing the sample into the real part RAM subunit group and the imaginary part RAM subunit group automatically;

a highly resource-saving of parallel correlation processor group, for completing high-performance correlation processing for multiple array elements and multiple targets in parallel, comprises: delay control of multiple signals separately; use highly resource-saving to complete the calculation of parallel related processor groups, that is, the use comprises one first input first output queue, one cache RAM, one sample storage RAM, one multiply-accumulate basic unit, and the logic resources including the correlation processing controllers complete the calculation of the real part, use equivalent resources to complete the calculation of the imaginary part; use the pipeline structure to save resources, after multi-stage pipeline calculation, the real part and imaginary part are respectively accumulated results, that is, the correlation sub-signals performs comprehensive calculations.

a multi-output data former, characterized in that, use the correlation energy results, the normalized correlation coefficient results after time gain compensation and the correlation time delay-phase results to form multiple output data results, comprises: add the square of the real part and the square of the imaginary part to get the correlation energy result; based on spherical wave attenuation or plenary wave attenuation, and the absorption attenuation of the corresponding frequency, combine related system parameters such as sound source level, transducer sensitivity, receiver gain, etc. calculating the energy-distance attenuation curve and time gain compensation-distance attenuation curve; calculating the correlation energy and intrinsic energy of the signal, and calculating the normalized correlation coefficient result; obtained by using time delay results combined with sampling frequency and points; correlation phase results can use CORDIC algorithm to obtain calculation correlation delay results, correlation phase results; use RAM and control state machine to realize the data formation of multiple output results, and outputting the flag bit signal to the outside.

The method comprises:

use multi-interface control to complete the reconfiguration of real-time correlation processing samples;

use FSM of sample management to calculating the a number of related points for expectation, the required number of parallel channels and the paddle number of sub-correlation units, completing splitting, flipping and writing of a sample;

use highly resource-saving of parallel correlation processor group to complete high-performance related processing for multiple array elements and multiple targets in parallel;

use the correlation energy results, the normalized correlation coefficient results after time gain compensation and correlation time delay-phase results to form the multiple output data results of simultaneous output.

use multi-interface control to complete the reconfiguration of real-time related processing samples, comprises: the parsed command and sample information are simultaneous directly used by subsequent units, and the data is written into FLASH simultaneously when receiving the sample information; each restart or command analysis all can automatically read from FLASH and realize automatic configuration;

use FSM of sample management calculating the a number of related points for expectation, the required number of parallel channels and the paddle number of sub-correlation units, completing splitting, flipping and writing of a sample, comprises: automatically calculate the number of related points for expectation, the required number of parallel channels and the paddle number of sub-correlation units according to the rules; splitting, flipping and writing the sample into the real part RAM subunit group and the imaginary part RAM subunit group automatically;

use highly resource-saving of parallel correlation processor group completing high-performance related processing for multiple array elements and multiple targets in parallel, comprises: delay control of multiple signals separately; use highly resource-saving to complete the calculation of parallel related processor groups, that is, the use comprises one first input first output queue, one cache RAM, one sample storage RAM, one multiply-accumulate basic unit, and the logic resources including the correlation processing controllers complete the calculation of the real part, use equivalent resources to complete the calculation of the imaginary part; use the pipeline structure to save resources, after multi-stage pipeline calculation, the real part and imaginary part are respectively accumulated results, that is, the correlation sub-signals are performs comprehensive calculations;

use correlation energy results, the normalized correlation coefficient results after time gain compensation and the correlation time delay-phase results to form multiple output data results, comprises: add the square of the real part and the square of the imaginary part to get the correlation energy result; based on spherical wave attenuation or plenary wave attenuation, and the absorption attenuation of the corresponding frequency, combine related system parameters such as sound source level, transducer sensitivity, receiver gain, etc. calculating the energy-distance attenuation curve and time gain compensation-distance attenuation curve; calculating the correlation energy and intrinsic energy of the signal, and calculating the normalized correlation coefficient result; obtained by using time delay results combined with sampling frequency and points; correlation phase results can use CORDIC algorithm to obtain calculation correlation delay results and correlation phase results; use RAM and control state machine to realize the data formation of multiple output results, and outputting the flag bit signal to the outside.

The embodiment of the present invention provides an FPGA-based real-time processing control method applied to underwater acoustic positioning and realizing reconfigurablility and multiple output, comprises:

use multi-interface control and command analysis unit to automatically complete the transmission and command analysis of sample information:

in the above solution, the multi-interface controller mainly includes a serial port controller, an Ethernet controller, a synchronous serial ports controller of a digital signal processor, a flash memory sample writing and reading controller and other interface controllers;

in the above solution, the command analysis unit can be simultaneously performed, and the sample information of each interface processor can cover each other after being triggered by a command;

on the one hand, the parsed command and sample information are simultaneous directly used by subsequent units;

on the other hand, the data is written into Flash when receiving the sample information, each restart or command analysis all can automatically read from it and realize automatic configuration.

The FSM of sample management is responsible for managing the obtained commands and data by the multi-interface control and command analysis unit:

in the above solution, the FSM of sample management after receiving the command take 2N groups sample information of N targets, comprises the real part of the N groups signal and the imaginary part of the N groups sample temporarily stored in the sample RAM storage unit;

in the above solution, the FSM of sample management is then by FSM of configured to control to automatically sequential split the N groups of sample information, each group of sample information is divided into $N_c$ groups of sub-sample information, and flipping, and then write the real part and the imaginary part into the real RAM subunit group and the imaginary RAM subunit group respectively.

The parallel related processor group simultaneously completes for M array elements (that is M channels of AD signals), N targets, that is MN channels high-performance related processing:

in the above solution, the single-channel high-performance correlation processing comprises a signal delay controller, a multi-channel correlation calculation subunit group and a correlation signal synthesis unit.

The result output also comprises correlation energy results, correlation energy results, normalized correlation coefficient results after time gain compensation, and correlation delay results, correlation phases result; the data former splices the output results according to the format and stores them in the data forming memory, and generates a flag bit signal after completion.

The embodiment of the present invention provides an FPGA-based real-time processing control method and device applied to underwater acoustic positioning and realizing reconfigurablility and multiple output, first use the multi-interface control and command analysis unit to obtain commands and parse out multiple groups of sample information, on the one hand, the parsed command and sample information are directly used by subsequent units at the same time; on the other hand, the data is written into Flash when receiving the sample information, each restart or command analysis all can automatically read from it and realize automatic configuration; the FSM of sample management is responsible for managing the obtained commands and data by the multi-interface control and command analysis unit, multi-channel sample information is automatically divided in sequence, and the real and imaginary parts are written into the real RAM subunit group and the imaginary RAM subunit group respectively; then the parallel related processor group simultaneously running the signal delay controller, the multi-channel correlation calculation subunit group and the correlation signal synthesis unit, completing for M array elements (that is M channels of AD signals), N targets, that is MN channels high-performance related processing in parallel; finally, will output the correlation energy results, correlation energy results, normalized correlation coefficient results after time gain compensation, and correlation time delay results, correlation phases result as multi-output results, through the data former splices the output results according to the format and stores them in the data forming memory, and generates a flag bit signal after completion. Thus, such that during a whole realization process, under a plurality of array elements and a plurality of targets, high-speed parallel correlation processing is realized, thereby solving problems in terms of real-time performance, universality and anti-noise performance, and effectively realizing high-performance correlation.

Figure 9:
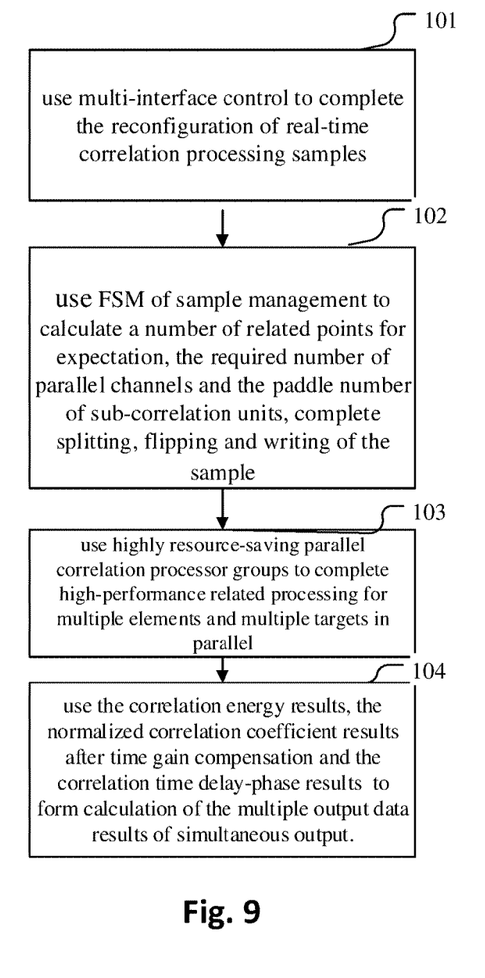
FIG. 9 is a schematic flow diagram of the FPGA-based real-time processing method applied to underwater acoustic positioning and realizing reconfigurablility and multiple output of the present invention.

The present invention will be further described in detail below with reference to the drawings and embodiments, FIG. 9 is a schematic flow diagram of the FPGA-based real-time processing method applied to underwater acoustic positioning and realizing reconfigurablility and multiple output according to an embodiment of the present invention, as the shown in FIG. 9, this embodiment provides an FPGA-based real-time processing relates method applied to underwater acoustic positioning and realizing reconfigurablility and multiple output, the method comprises:

Step 101: first use the multi-interface control and command analysis unit to obtain commands and parse out multiple groups of sample information;

specifically, this step comprises: the parsed command and sample information are simultaneous directly used by subsequent units; the data is written into Flash when receiving the sample information, each restart or command analysis all can automatically read from it and realize automatic configuration.

Step 102: the FSM of sample management is responsible for managing the obtained commands and data by the multi-interface control and command analysis unit;

specifically, this step comprises: completing command analysis and obtain commands and data; calculating a number of related points for expectation, the required number of parallel channels and the paddle number of sub-correlation units; splitting, flipping and writing of the sample into the real part RAM subunit group and the imaginary part RAM subunit group.

Step A1: completing command analysis and obtain commands and data;

multiple commands and data obtained by multiple interfaces are processed with "OR" as a logical relationship, and data acquisition is triggered. When power is on, that is when $t=t_0$, always use FLASH to automatically read the initialization commands and data, that is $CMD_{FLASH}$ to drive, follow up, that is when $t>t_0$, based on subsequent commands such as serial port commands $CMD_{UART}$, Ethernet commands $CMD_{ETH}$, DSP commands $CMD_{SPORT}$ and other commands $CMD_{OTHER}$ to be cover.

Simply, system commands can be synthesized as:

$$CMD_{SYS} = \begin{cases} CMD_{FLASH}, & t = t_0 \\ CMD_{UART} \| CMD_{ETH} \| CMD_{SPORT} \| CMD_{OTHER}, & t > t_0 \end{cases} \quad (1)$$

among them, the represents the OR calculation.

Step A2: calculating a number of related points for expectation, the required number of parallel channels and the paddle number of sub-correlation units;

assuming that the maximum sampling frequency of AD is $f_s$, the pulse width of the signal to be detected is set to as $T_d$, the total number of related points for expectation is $$N_{total} = f_s T_d \quad (2)$$

assuming that the FPGA processing fast clock is $f_{clk}$, the maximum number of relevant points for a single calculation is $$N_{max} = \frac{f_{clk}}{f_s} \quad (3)$$

the required number of parallel channels is:

$$N_{MUX} \geq \left\lceil \frac{N_{total}}{N_{max}} \right\rceil \text{且} N_{MUX} \leq N_{Ch-max} \quad (4)$$

among them, the [•] represents rounding up, $N_{Ch-max}$ is determined by dividing 60% of the total FPGA resources by the ratio of single-time related computing resources in the auto-correlation computing unit.

Thus, the effective number of correlation points in a single calculation of the sub-correlation calculation unit is:

$$N_{valid} = \frac{N_{total}}{N_{MUX}} \quad (5)$$

among them, the actual number of relevant points for a single calculation is:

$$N_d \leq N_{max} \quad (6)$$

the paddle number of sub-correlation units is:

$$N_{pd} = N_{mux} \cdot N_d - N_{total} \quad (7)$$

Step A3: splitting and flipping the sample and writing them into the real part RAM subunit group and the imaginary part RAM subunit group automatically;

the multi-channel sample information is automatically divided in sequence, and the real part and the imaginary part are respectively written into the real part RAM subunit group and the imaginary part RAM subunit group.

Here, the real part and imaginary part of the whole sample corresponding to target C are respectively is $r^C(n)$ and $i^C(n)$, then the samples required by each parallel computing subunit are divided into $r_0^C(n)$, $r_1^C(n)$, ... and $r_{N_{mux}-1}^C(n)$, as well as $i_0^C(n)$, $i_1^C(n)$, ... and $i_{N_{mux}-1}^C(n)$;

and then, turn it over and record it as $r_0^C(-n)$, $r_1^C(-n)$, ... and $r_{N_{mux}-1}^C(n)$, as well as $i_0^C(-n)$, $i_1^C(-n)$, ... and $i_{N_{mux}-1}^C(-n)$;

after that, zero padding the sample and record it as $\hat{r}_0^C(-n)$, $\hat{r}_1^C(-n)$, ... and $\hat{r}_{N_{mux}-1}^C(-n)$, as well as $\hat{i}_0^C(-n)$, $\hat{i}_1^C(-n)$, ... and $\hat{i}_{N_{mux}-1}^C(-n)$;

finally, the samples after splitting, flipping and zero padding are automatically written into the real and imaginary RAM cells in sequence.

Step 103: realize the calculation of parallel related processor groups, in parallel completing for M array elements (that is M channels of AD signals), N targets, that is MN channels high-performance related processing.

Specifically, this step comprises: completing signal delay control; correlation calculation subunit group calculation; correlation sub-signal synthesis.

Step B1: complete signal delay control;

divide the signal $s(n)$ into $N_{MUX}$ channels, delay separately and input to the relevant subunit group, among them, the first input is the original signal $s(n)$, the first output $s_1(n) = s(n-N_d)$; the second input is the first output, that is $s_1(n)$, the second output $s_1(n) = s(n-2N_d)$; by parity of reasoning, the last input is $s_{N_{mux}-2}(n)$, the last output is $s_{N_{mux}-1}(n) = s(n-(N_{mux}-1)N_d)$.

Step B2: complete correlation calculation subunit group calculation;

assuming the standard calculation of signal energy is:

$$Cor(x) = \left( \sum_{n=0}^{N_{total}} s(n-x)r(n) \right)^2 + \left( \sum_{n=0}^{N_{total}} s(n-x)i(n) \right)^2 \quad (8)$$

the related processing parallel calculation is:

$$Cor(x) = \left( \sum_{p=0}^{N_{MUX}-1} CorSliceR_p(x) \right)^2 + \left( \sum_{p=0}^{N_{MUX}-1} CorSliceI_p(x) \right)^2 \quad (9)$$

here, $$CorSliceR_p(x) = \sum_{t=0}^{N_c} s(t - pt_d - x) r_p(-t) \quad (10)$$

$$CorSliceI_p(x) = \sum_{t=0}^{N_c} s(t - pt_d - x) i_p(-t) \quad (11)$$

Figure 1:
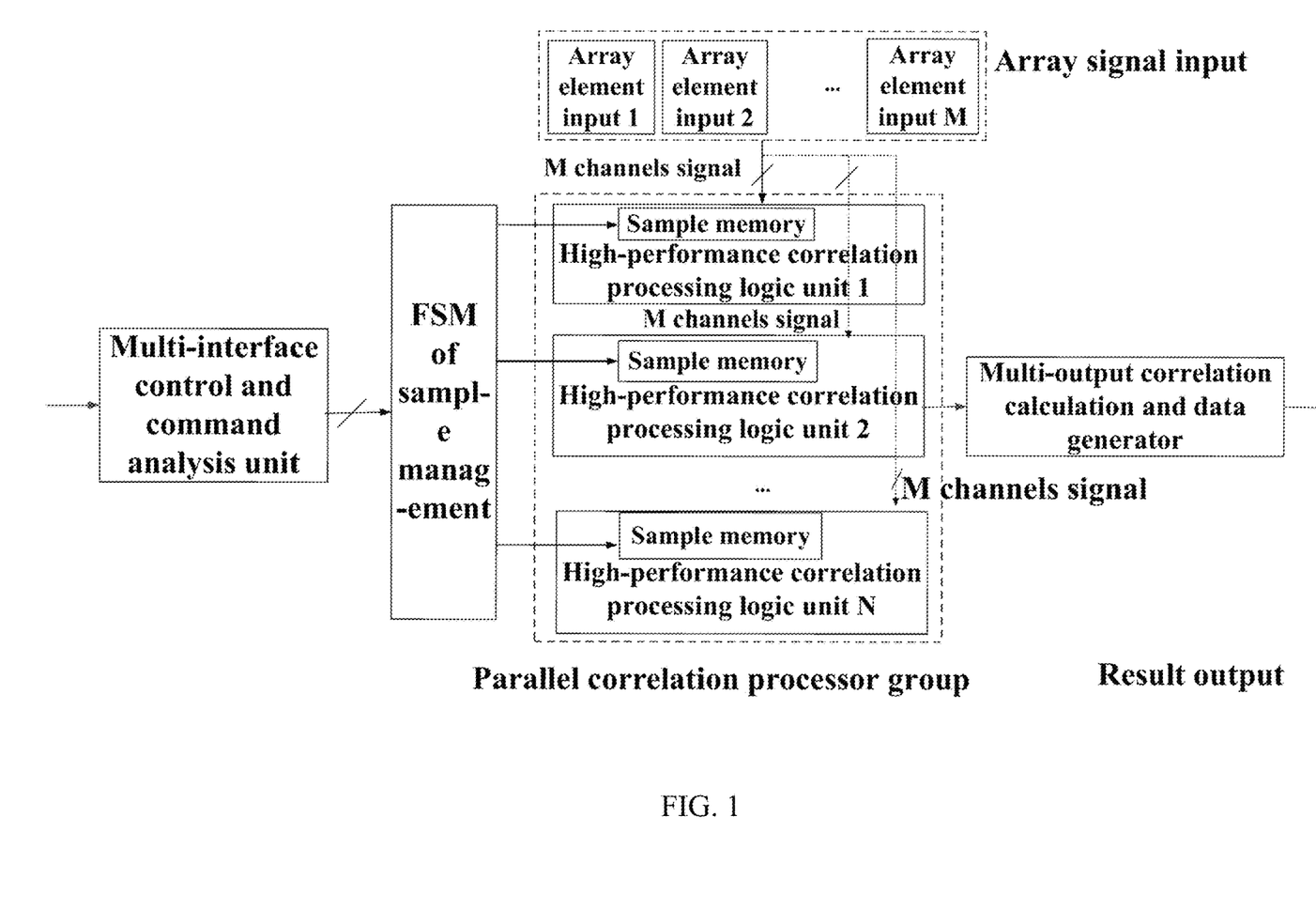
FIG. 1 is a schematic structural diagram of the FPGA-based real-time processing system applied to underwater acoustic positioning and realizing reconfigurablility and multiple output of the present invention.
Figure 2:
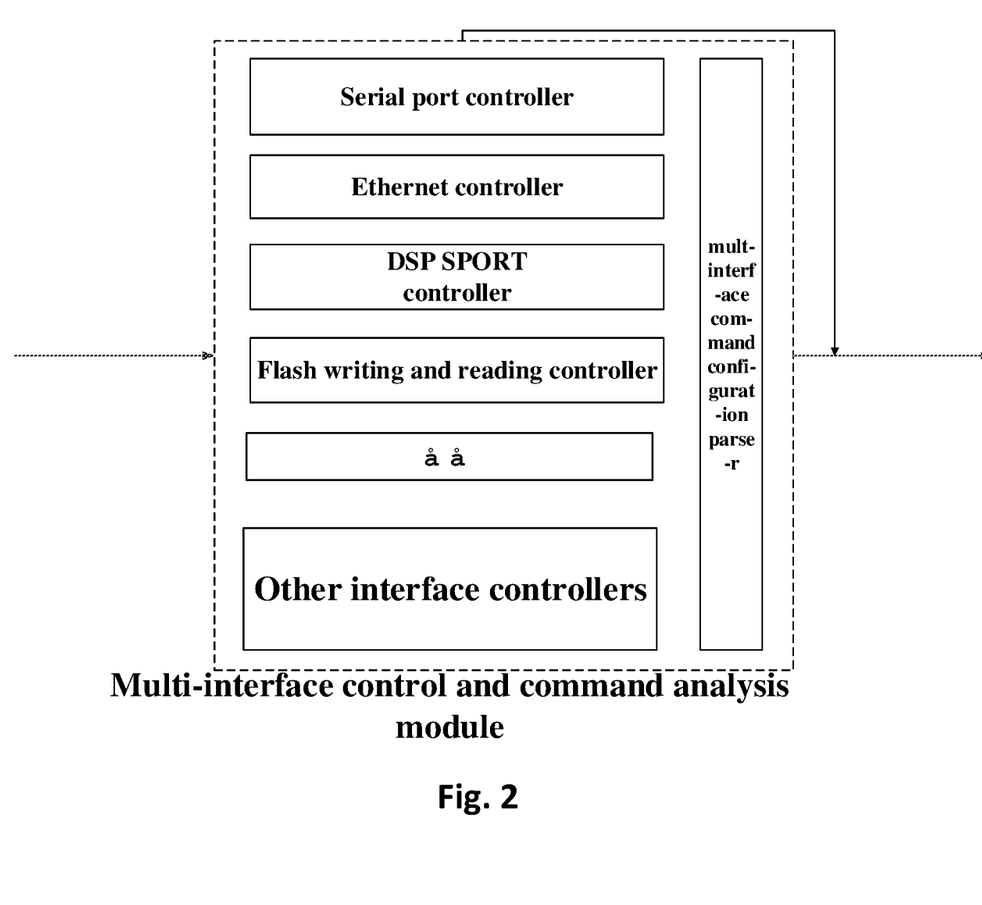
FIG. 2 is a schematic structural diagram of multi-interface control and command analysis module of the FPGA-based real-time processing system applied to underwater acoustic positioning and realizing reconfigurablility and multiple output of the present invention.
Figure 3:
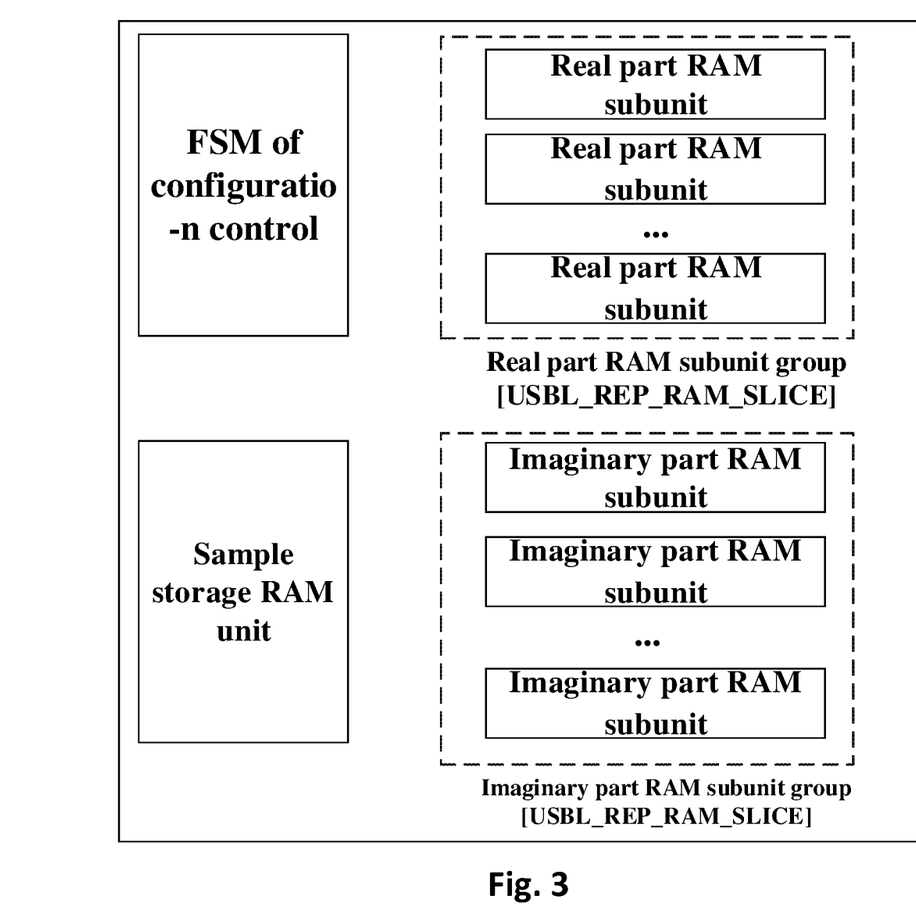
FIG. 3 is a schematic structural diagram of FSM of sample management of the FPGA-based real-time processing system applied to underwater acoustic positioning and realizing reconfigurablility and multiple output of the present invention.
Figure 4:
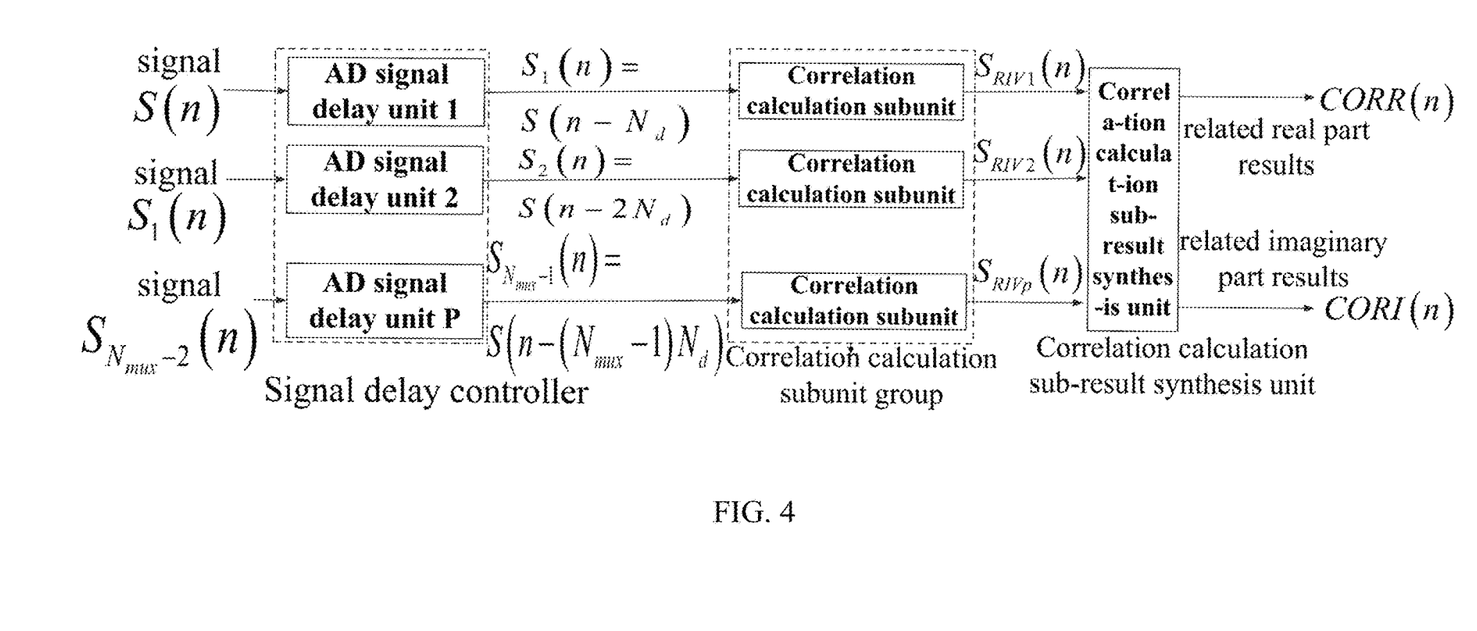
FIG. 4 is a schematic structural diagram of the correlation calculation in the correlation calculation subunit group of the FPGA-based real-time processing system applied to underwater acoustic positioning and realizing reconfigurablility and multiple output of the present invention.
Figure 5:
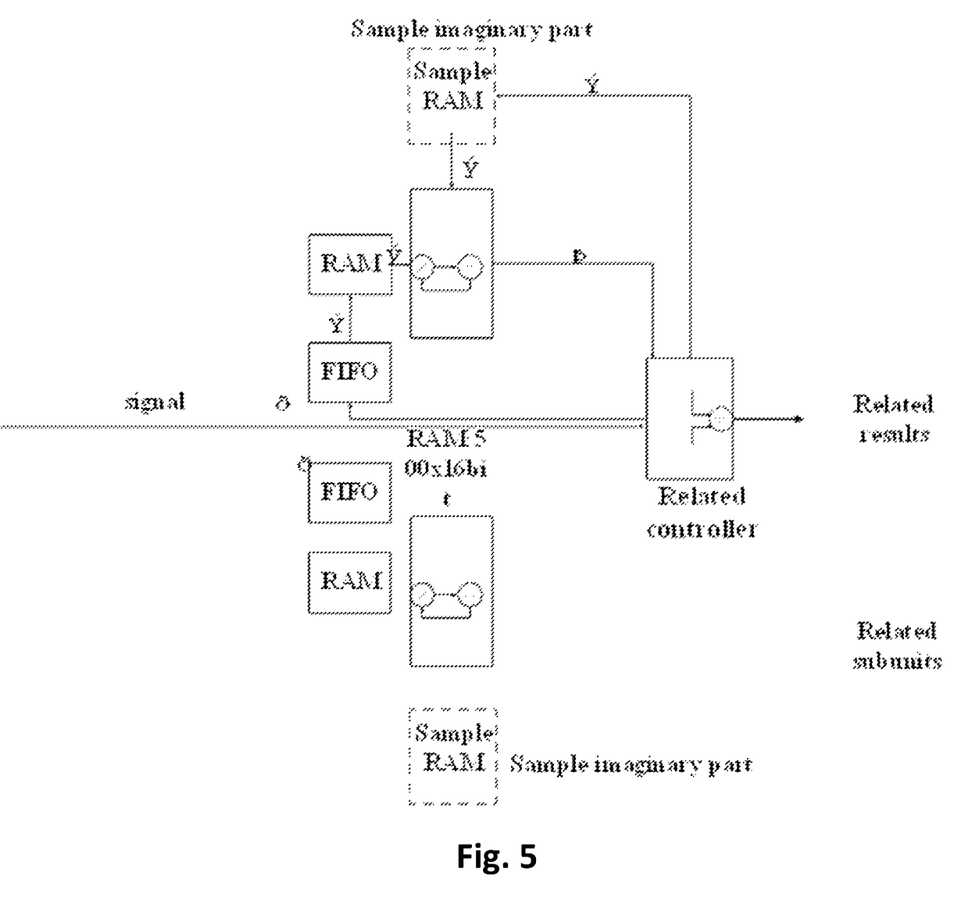
FIG. 5 is a schematic structural diagram of the basic calculation of the correlation calculation subunit in the correlation calculation subunit group of the FPGA-based real-time processing system applied to underwater acoustic positioning and realizing reconfigurablility and multiple output of the present invention.
Figure 6:
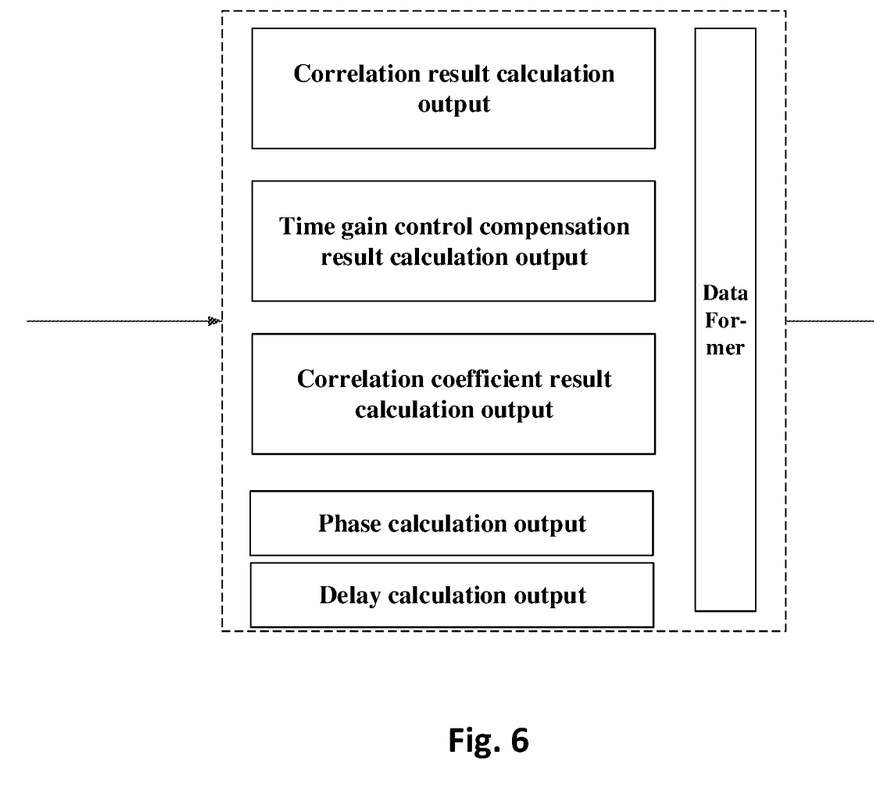
FIG. 6 is a schematic structural diagram of multi-output calculation and data generator of the FPGA-based real-time processing system applied to underwater acoustic positioning and realizing reconfigurablility and multiple output of the present invention.

Step B2 mainly completes the sub-unit calculation of (10) (11), and the calculation structure is shown in FIG. 5.

Among them, the calculation of the real and imaginary parts of the subunit each comprises one first input first output (FIFO) queue, one cache RAM, one sample storage RAM, one multiply-accumulate basic unit, and related processing controllers. This structure greatly saves resources and provides a guarantee for large-scale parallelization.

Step B3: complete correlation sub-signals for synthesis;
complete the square operation in (9), and use the pipeline structure to save resources, after $\lceil \log_2(N_{mux}) \rceil$-stage pipeline calculation, the real and imaginary results are obtained.

Step 104: complete correlation energy results, time gain compensation correlation energy results, normalized correlation coefficient results, and correlation delay results, correlation phases result; the data former splices the output results according to the format and stores them in the data forming memory, and generates a flag bit signal after completion, and then output.

Specifically, this step comprises: calculate correlation energy results, calculate time gain compensation correlation energy results, calculate normalized correlation coefficient results; calculate correlation delay results, correlation phases result; data formation and output.

Step C1: calculate correlation energy results;
use (9) to sum up the square of the real part and the square of the imaginary part to obtain the correlation energy result.

Figure 7:
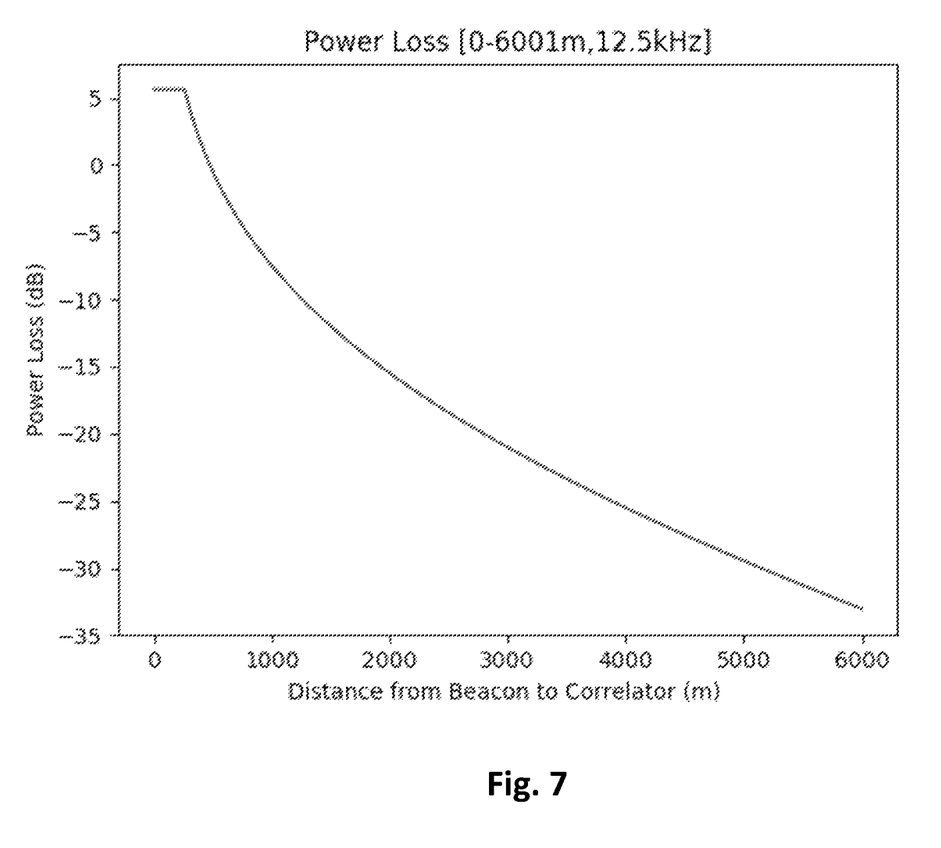
FIG. 7 is a schematic diagram of the energy-distance attenuation curve of the FPGA-based real-time processing system applied to underwater acoustic positioning and realizing reconfigurablility and multiple output of the present invention.
Figure 8:
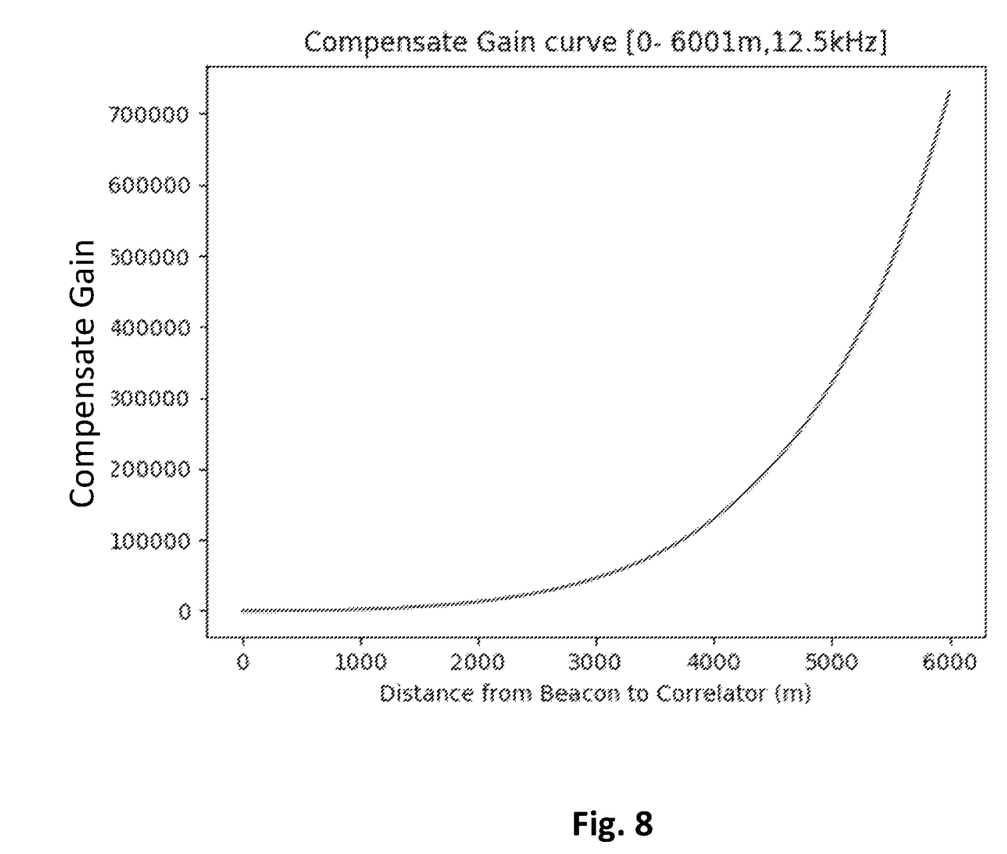
FIG. 8 is a schematic diagram of the time gain compensation-distance attenuation curve of the FPGA-based real-time processing system applied to underwater acoustic positioning and realizing reconfigurablility and multiple output of the present invention.

Step C2: calculate time gain compensation correlation energy results;
based on spherical wave attenuation or plenary wave attenuation, and the absorption attenuation of the corresponding frequency, combine related system parameters such as sound source level, transducer sensitivity, receiver gain, etc. calculating the energy-distance attenuation curve is shown in FIG. 7, and time gain compensation-distance attenuation curve is shown in FIG. 8.

Step C3: calculate normalized correlation coefficient results;
according to (12) the normalized correlation coefficient result can be obtained:

$$\rho(x) = \frac{Cor(x)}{\left( \sum_{n=0}^{N_{total}} s^2(n) \right)} \quad (12)$$

Among them, the range of $\rho(x)$ is $$\left[ 0, \sum_{n=0}^{N_{total}} r^2(n) \right].$$

Step C4: calculate correlation delay results, correlation phases result;
the time delay results combined with sampling frequency and points to obtain; correlation phase results can use CORDIC algorithm to obtain.

Step C5: data formation and output.
Realize the data formation of multiple output results, and outputting the flag bit signal to the outside.

Using the FPGA-based real-time processing system and method applied to underwater acoustic positioning and realizing reconfigurability and multiple output, such that during a whole realization process, under a plurality of array elements and a plurality of targets, high-speed parallel correlation processing is realized, thereby solving problems in terms of real-time performance, universality and anti-noise performance, and effectively realizing high-performance correlation. It can be automatically transmitted and configured through multiple interfaces, which is universal; realize universal parallel computing during processing, not affected by changes in the number of channels numbers and target numbers, and the related of multiple outputs form into data output, forming a collaborative processing mechanism, it has obvious innovation and improvement in the universality, real-time performance and anti-noise performance of real-time correlation processing.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A field-programmable gate array (FPGA)-based real-time processing system applied to underwater acoustic positioning and realizing reconfigurablility and multiple output, the system comprising:
   a multi-interface control and command analysis module, for automatically completing sample information transmission and command analysis;
   a finite-state machine (FSM) of sample management, connected with the multi-interface control and command analysis module, for calculating related data, and completing splitting, flipping and writing of a sample;
   a parallel correlation processor group, connected with the FSM of sample management, for completing, in parallel, high-performance processing operations regarding a plurality of targets;
   a multi-output data former, connected with the parallel correlation processor group, for simultaneously realizing data formation of a multiple output result and outputting a flag bit signal to the outside to achieve universality, real-time performance and anti-noise performance of real-time correlation processing; and
   wherein multiple commands and data obtained by the multi-output data former are processed with "OR" as a logical relationship, and data acquisition is triggered when power is on ($t=t_0$), and a flash memory (FLASH) is used to automatically read initialization commands and the data obtained;
   wherein commands comprise $CMD_{FLASH}$ the flash drive ($t=t_0$), and when $t>t_0$, serial port commands $CMD_{UART}$, Ethernet commands $CMD_{ETH}$, commands $CMD_{SPORT}$, other commands $CM_{OTHER}$ where the system commands are synthesized as follows;

$$CMD_{SF3} = \begin{cases} CMD_{FLASH}, & \tau = t_0 \\ CMD_{UART} \| CMD_{ETH} \| CMD_{SPORT} \| CMD_{OTHER}, & \tau > t_0 \end{cases}$$

wherein a calculation of a number of related points for expectation, a required number of parallel channels, and a paddle number of sub-correlation units is obtained with a maximum sampling frequency of analog to digital (AD) of $f_s$, and a width of a signal to be detected is set to as $T_d$, where the total number of related points for expectation is as follows:

$$N_{total} = f_s T_d$$

wherein a processing fast clock of the FPGA is $f_{clk}$, the maximum number of relevant points for a single calculation is as follows:

$$N_{max} = \frac{f_{clk}}{f_s}$$

and the actual number of relevant points for a required number of parallel channels is as follows:

$$N_{MUX} \geq \left\lceil \frac{N_{total}}{N_{max}} \right\rceil, N_{MUX} \leq N_{Ch-max}$$

and an effective number of correlation points in the single calculation of the sub-correlation unit is as follows:

$$N_{valid} = \frac{N_{total}}{N_{MUX}}$$

and an actual number of relevant points for a single calculation is as follows:

$N_d \leq N_{Mux}$, and where the paddle number of sub-correlation units is as follows:

$N_{pd} = N_{mux} \cdot N_d - N_{total}$.

2. The FPGA-based real-time processing system according to claim 1, wherein the multi-interface control and command analysis module comprises:
   a controller group, for receiving commands and sample information of each interface; and
   a multi-interface command configuration parser, connected with the controller group, for analyzing processing commands and sample information, and simultaneously transmitting to the FSM of sample management, and the sample information triggered by the command will cover each other after processing.

3. The FPGA-based real-time processing system according to claim 2, wherein the multi-interface control and command analysis module writes the sample information into a flash memory, for realizing automatically reading and automatically configuring under the restart or command analysis operations.

4. The FPGA-based real-time processing system according to claim 1, wherein the FSM of sample management comprises:
   a FSM of configuration control, connected with the multi-interface command configuration parser, for calculating the number of related points for expectation, the required number of parallel channels and the paddle number of sub-correlation units;
   a sample storage RAM unit, comprising a real part RAM subunit group and an imaginary part RAM subunit group, both connected with the parallel correlation processor group, for splitting and flipping the sample information and writing them into the real part RAM subunit group and the imaginary part RAM subunit group respectively, the real part RAM subunit group is for storing real part data, the imaginary part RAM subunit group is for storing imaginary part data.

5. The FPGA-based real-time processing system according to claim 1, wherein the parallel correlation processor group comprises:
   a delay controller, connected with a sample storage RAM unit, for delay control of multiple signals separately;
   a multi-path correlation calculation subunit group, connected with the delay controller, for completing a real part and an imaginary part calculation of data in parallel; and
   a correlation signal synthesis unit, connected with the multi-path correlation calculation subunit group, for accumulating the real part and the imaginary part respectively, and performing comprehensive calculations on a set of correlation sub-signals.

6. The FPGA-based real-time processing system according to claim 1, wherein the multi-output data former comprises:
   a calculation output unit, connected with the parallel correlation processor group, for calculating and multiply outputting correlation energy results, correlation energy results, normalized correlation coefficient results after time gain compensation, and correlation time delay results, correlation phases result;
   a data forming unit, connected with the calculation output unit, for storing each output result into a data forming memory and outputting the flag bit signal to the outside.

7. A field-programmable gate array (FPGA)-based real-time processing control method applied to underwater acoustic positioning and realizing reconfigurablility and multiple output by using the system of claim 1, wherein the method comprises:
   (1) the multi-interface control and command analysis module completing the reconfiguration of real-time correlation processing samples;
   (2) the FSM of sample management calculating a number of relevant points for expectation, a required number of parallel channels and a paddle number of sub-correlation units, and completing splitting, flipping and writing of a sample;
   (3) the parallel correlation processor group completing high-performance correlation processing for multiple array elements and multiple targets in parallel; and
   (4) the multi-output data former through the correlation energy results, the normalized correlation coefficient results after time gain compensation, correlation time delay results and correlation phases result to complete multiple output data results.

8. The FPGA-based real-time processing control method according to claim 7, wherein the FSM of sample management comprises a FSM of configuration control and a sample storage RAM unit, the sample storage RAM unit comprising a real part RAM subunit group and an imaginary part RAM subunit group, the step (2) further comprising:
   the FSM of configuration control completing command analysis and obtaining commands and data;
   the FSM of configuration control calculating a number of relevant points for expectation, the required number of parallel channels and a paddle number of sub-correlation units; and
   the sample storage RAM unit splitting and flipping the sample information and writing the sample information into the real part RAM subunit group and the imaginary part RAM subunit group.

9. The FPGA-based real-time processing control method according to claim 8, wherein the parallel correlation processor group comprises a delay controller, a multi-path correlation calculation subunit group and a correlation signal synthesis unit, the step (3) further comprising:
   the delay controller completing signal delay control;
   the multi-path correlation calculation subunit group completing the real part and the imaginary part calculation of data in parallel; and the correlation signal synthesis unit performing comprehensive calculations on the correlation sub-signals.

* * * * *